(12) United States Patent
Gaffney et al.

(10) Patent No.: US 6,698,313 B2
(45) Date of Patent: Mar. 2, 2004

(54) DUAL MOTOR GEAR DRIVE UNIT

(75) Inventors: Thomas E Gaffney, Cedarburg, WI (US); Edward J Gaffney, Pewaukee, WI (US)

(73) Assignee: Fairway Golf Cars, LLC, Waukesha, WI (US)

( * ) Notice: Subject to any disclaimer, the term of this patent is extended or adjusted under 35 U.S.C. 154(b) by 46 days.

(21) Appl. No.: 10/053,244

(22) Filed: Jan. 15, 2002

(65) Prior Publication Data

US 2003/0132039 A1 Jul. 17, 2003

(51) Int. Cl.$^7$ ................................................ B60K 1/02
(52) U.S. Cl. ..................... 74/665 N; 180/65.6
(58) Field of Search .......................... 74/665 L, 665 N; 475/5; 180/65.1, 65.3, 65.6, 65.7

(56) References Cited

U.S. PATENT DOCUMENTS

| | | | | |
|---|---|---|---|---|
| 5,372,213 A | * | 12/1994 | Hasebe et al. | 180/65.6 |
| 5,762,154 A | * | 6/1998 | Hsu | 180/15 |
| 5,921,338 A | * | 7/1999 | Edmondson | 180/65.5 |
| 6,089,341 A | * | 7/2000 | Gingerich | 180/65.1 |

* cited by examiner

*Primary Examiner*—Ankur Parekh
(74) *Attorney, Agent, or Firm*—Andrus, Sceales, Starke & Sawall, LLP

(57) ABSTRACT

A gear drive assembly comprises two drive motors, each individually driving one propulsion element. The assembly accommodates transaxle-type mounting on a vehicle.

11 Claims, 6 Drawing Sheets

DUAL MOTOR GEAR DRIVE UNIT

FIELD OF THE INVENTION

The invention generally relates to propulsion mechanisms for smaller, usually battery-powered vehicles, such as golf carts, wheel chairs, and portable personal mobility scooters for physically challenged individuals.

BACKGROUND OF THE INVENTION

There is a need for more compact, less complicated, and lighter weight gear drive systems. These attributes are important, particularly with respect to smaller, typically battery powered vehicles, like wheelchairs or golf carts or personal mobility scooters.

SUMMARY OF THE INVENTION

The present invention provides a propelling, and optionally power steering, gear drive assembly that comprises two drive motors, each individually driving one propulsion element. The assembly accommodates transaxle-type mounting on a vehicle. By using two separate drive motors individually coupled to separate propulsion elements, instead of one drive motor coupled by a differential drive train to multiple propulsion elements, each drive motor experiences half the torque and requires half the current of a single drive motor at the same voltage. The gear drive assembly thereby enables the use of smaller, less expensive high speed motors, together totaling less expense than a single larger motor. Lighter weight, less complexity, and redundancy result in a small space.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION OF A PREFERRED EMBODIMENT

Figure 1:
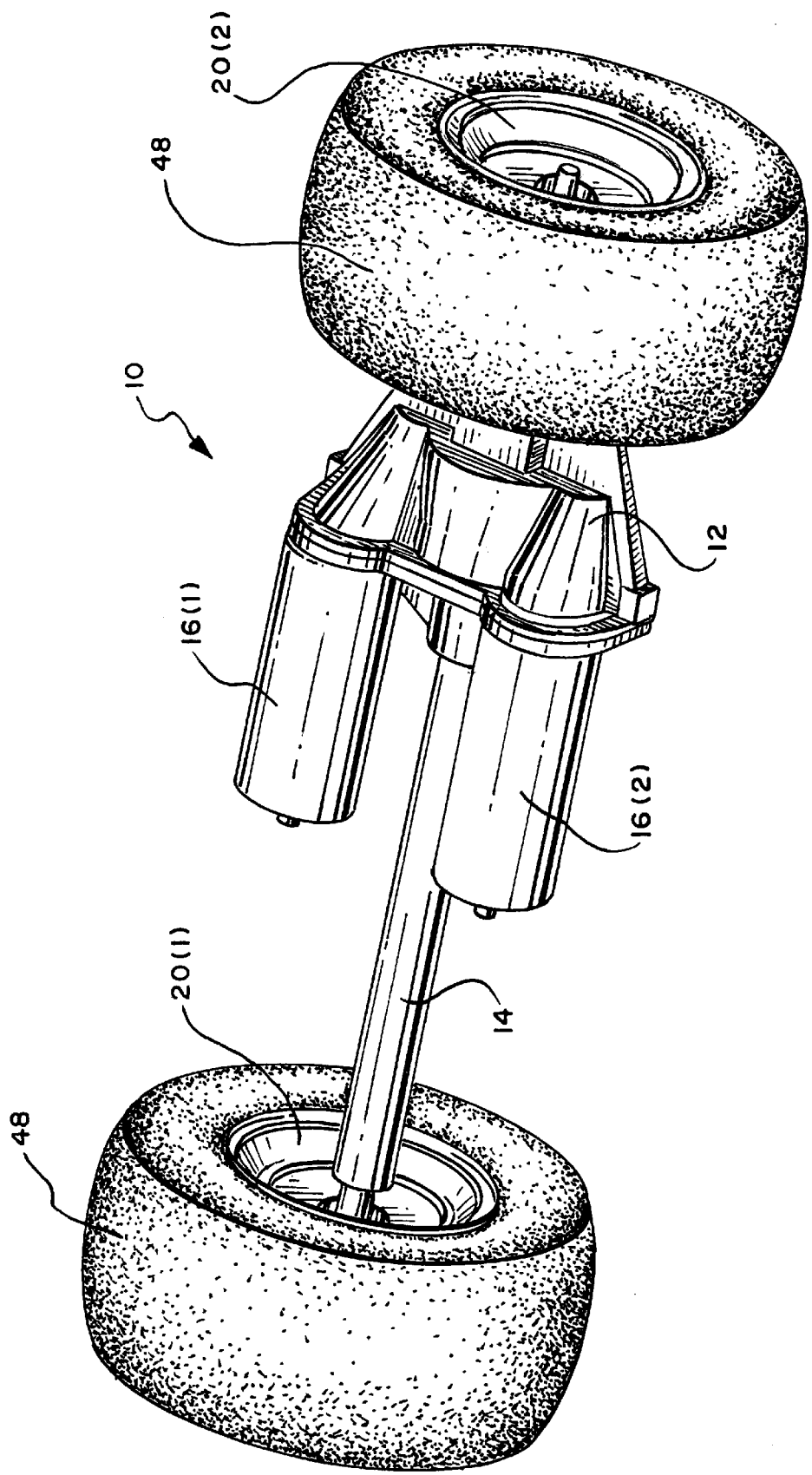
FIG. 1 is a perspective view of a dual motor gear drive assembly that embodies features of the invention.

FIG. 1 shows a dual motor gear drive assembly 10 that embodies the features of the invention. The gear drive assembly 10 is well suited for use with smaller vehicles, like a golf cart, or a motorized wheel chair, or a motorized personal mobility scooter. Still, the features of the gear drive assembly 10 are usable in other environments and larger vehicles, too.

Figure 2:
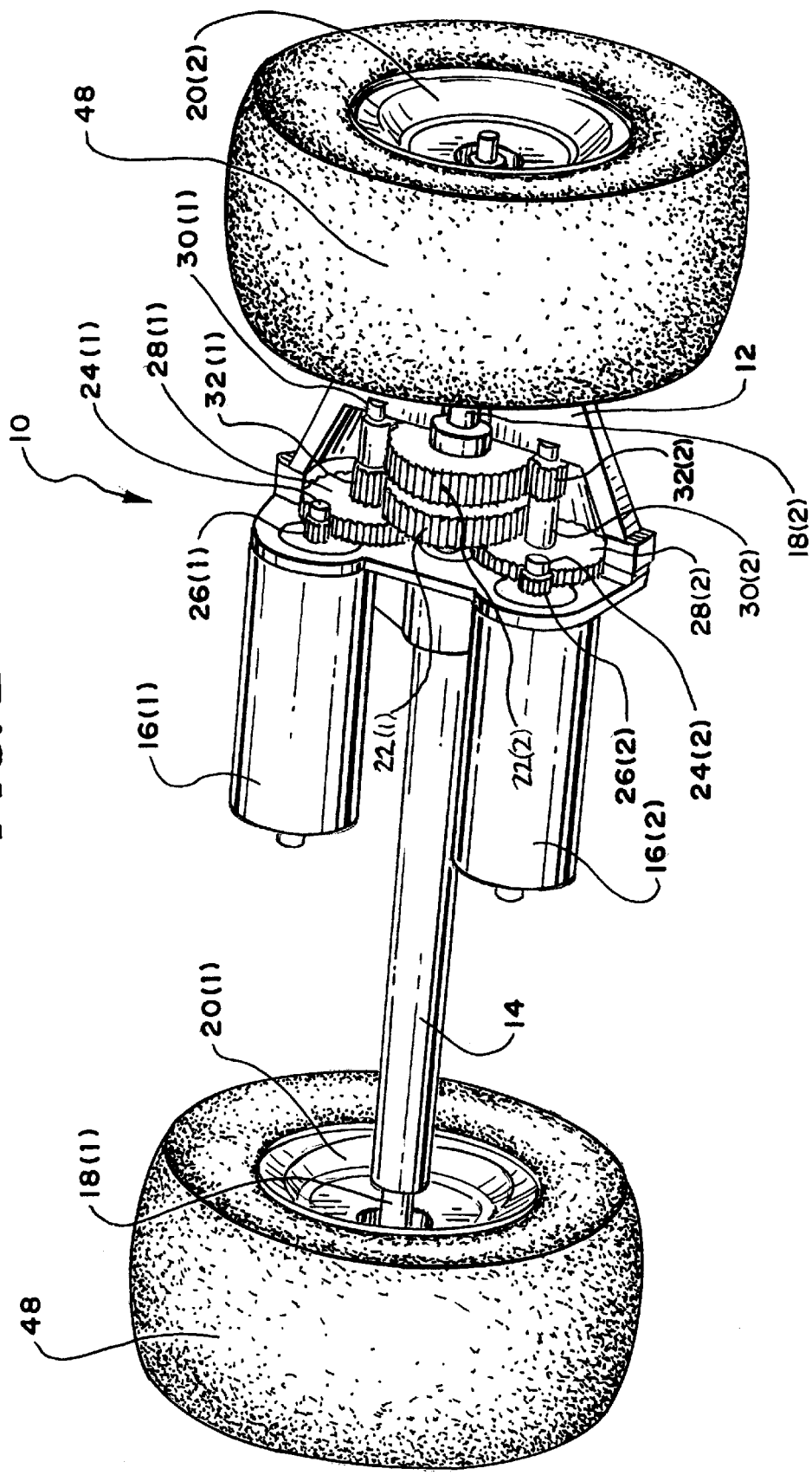
FIG. 2 is a perspective view of the dual motor gear drive assembly shown in FIG. 1, with a portion of the protective housing removed to show the interior working components of the assembly.
Figure 3:
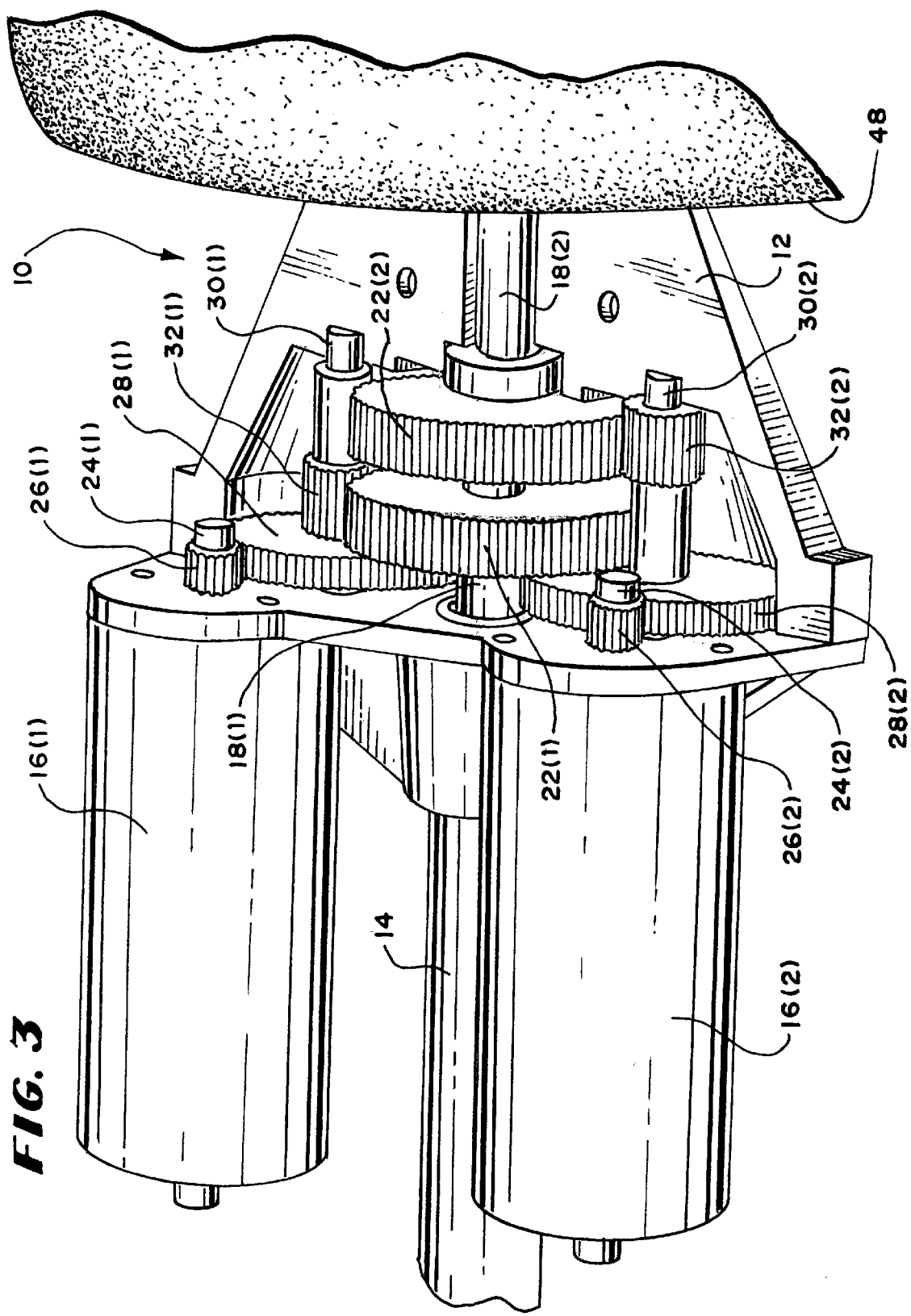
FIG. 3 is an enlarged perspective view of the interior working components of the assembly shown in FIG. 2.
Figure 4:
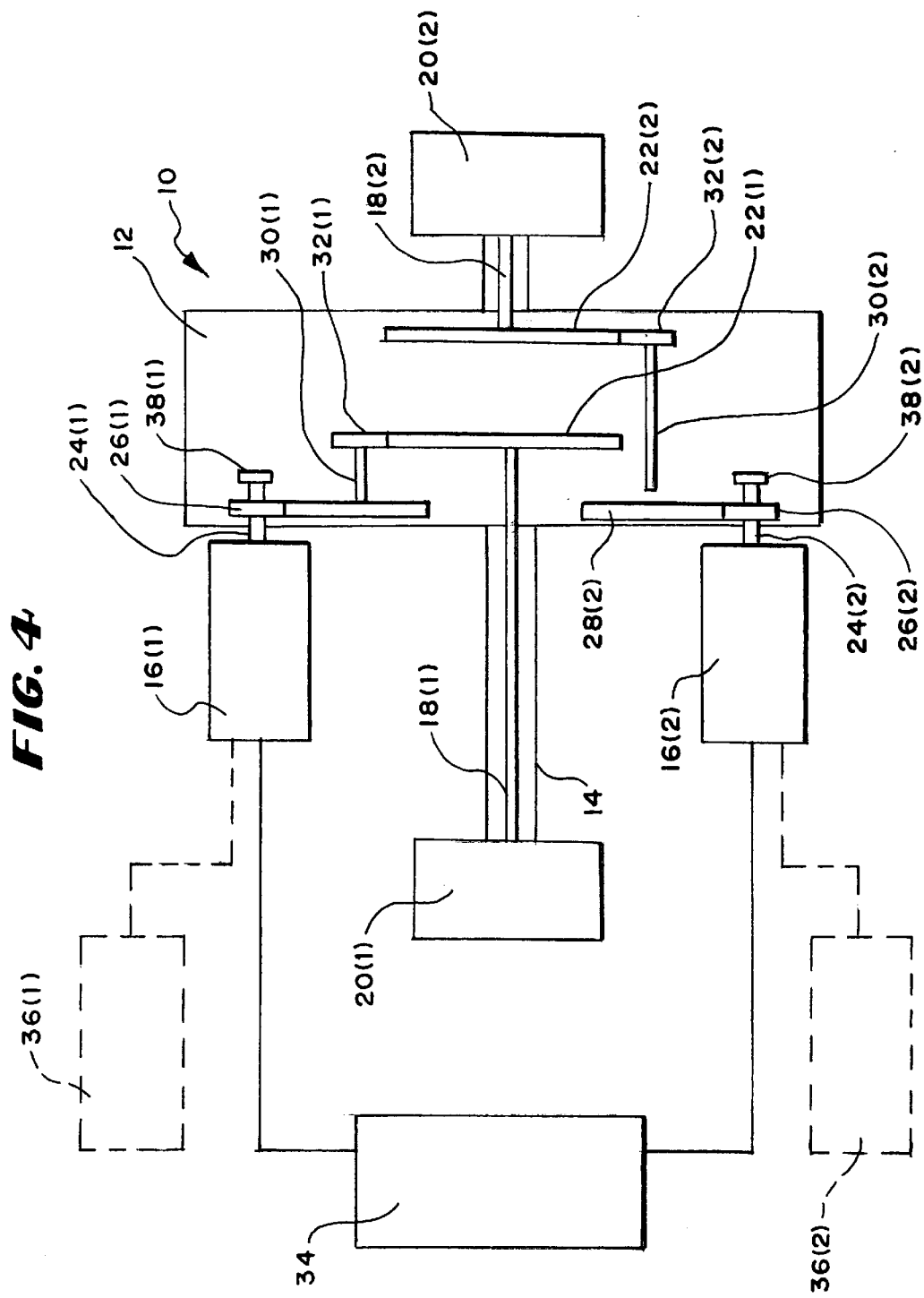
FIG. 4 is a schematic view of the working components of the assembly shown in FIG. 3.

In use (as FIG. 1 shows), the gear drive assembly 10 is enclosed within a protective housing 12 that forms an axle 14 for a vehicle. FIGS. 2 and 3 shows a part of the housing 12 removed to expose the working parts of the gear drive assembly 10. FIG. 4 shows the components of the gear drive assembly 10 in schematic form.

The gear drive assembly 10 propels a vehicle by imparting rotation from two drive motors 16(1) and 16(2) through individual drive trains to two propulsion elements 18(1) and 18(2). In the illustrated embodiment, the propulsion elements 18(1) and 18(2) take the form of drive shafts. As FIGS. 1 and 2 show, each drive shaft 18(1) and 18(2) carries a drive wheel 20(1) and 20(2) fitted with a pneumatic tire 48. Each drive motor 16(1) and 16(2) is individually coupled by a separate drive train to a single one of the drive shafts, respectively 18(1) and 18(2).

It should be appreciated that the propulsion elements 18 driven by the gear drive assembly 10 can take other forms. The propulsion elements 18 can comprise track drives, or water wheels or rotatable pontoons provided with auger-like surface projections for propelling a boat.

The drive train of the gear drive assembly 10 includes first and second main drive gears 22(1) and 22(2), coupled, respectively, to the first and second drive motors 16(1) and 16(2). The first main drive gear 22(1) is supported for rotation on the first drive shaft 18(1), to impart rotation from the first drive motor 16(1) to the first drive shaft 18(1). Likewise, the second main drive gear 22(2) is supported for rotation on the second drive shaft 18(2), to impart rotation from the second drive motor 16(2) to the second drive shaft 18(2).

The drive shafts 18(1) and 18(2) are carried in separate bushings in the gear drive assembly 10 for independent rotation. By virtue of this construction, the main drive gears 22(1) and 22(2) (and, accordingly, the drive shafts 18(1) and 18(2) themselves) can be rotated by the drive motors 16(1) and 16(2) at different rates of rotation.

To link the drive motors 16(1) and 16(2) to their respective drive shafts 18(1) and 18(2), each drive motor 16(1) and 16(2) includes an output shaft 24(1) and 24(2), which carries an output gear 26(1) and 26(2). The output gear 26(1) and 26(2) of each drive motor 16(1) and 16(2) is, in turn, coupled to a transfer gear 28(1) and 28(2), which imparts rotation to an associated transfer shaft 30(1) and 30(2). Each transfer shaft 30(1) and 30(2), in turn, carries its own transfer drive gear 32(1) and 32(2).

The transfer gear 32(1) driven by the first drive motor 16(1) is coupled to the first main drive gear 22(1). Through this linkage, the first drive motor 16(1) imparts rotation to the first main drive gear 22(1), and thus to the first drive shaft 18(1).

The transfer gear 32(2) driven by the second drive motor 16(2) is coupled to the second main drive gear 22(2). Through this linkage, the second drive motor 16(2) imparts rotation to the second main drive gear 22(22), and thus to the second drive shaft 18(2).

The drive ratio between each drive motor 16(1) and 16(2) and its respective drive shafts 18(1) and 18(2) can be adjusted, as desired, by reducing the diameter of the drive gear 22(1) and 22(2) or increasing the diameter of the transfer gears 28(1)/28(2) or 32(1)/32(2), or combinations thereof.

The first and second drive motors 16(1) and 16(2) can comprise either brushless or brush-type motors. The first and second drive motors 16(1) and 16(2) each desirable comprises a high speed, two-brush motor. The two motors 16(1)

and 16(2), independently driving separate propulsion elements 18(1) and 18(2), take the place of a single larger, four brush motor (which is not high speed), as conventionally used in differential transaxle assemblies. By using two separate drive motors 16(1) and 16(2) individually coupled to separate propulsion elements 18(1) and 18(2), instead of one drive motor coupled by a differential drive train to multiple propulsion elements, each drive motor 16(1) and 16(2) experiences half the torque and requires half the current of a single drive motor at the same voltage. The gear drive assembly 10 thereby enables the use of smaller, less expensive high speed motors, together totaling less expense than a single larger motor. Lighter weight and less complexity result in a smaller space.

The first and second drive motors 16(1) and 16(2) can be wired in parallel and controlled by a single control circuit 34 (see FIG. 4) to provide identical propulsion to the drive shafts 18(1) and 18(2). When driven by a single control circuit, the current provided by the control output divides between the motors 16(1) and 16(2), as needed. The first and second drive motors 16(1) and 16(2) can also be controlled by individual control circuits 36(1) and 36(2), as shown in phantom lines in FIG. 4. In this arrangement, the motors 16(1) and 16(2) can be driven at different speeds to prove power assist during manual steering. If other wheels of the vehicle are allowed to caster freely, differential propulsion can provide all the steering.

Alternatively, the first and second drive motors 16(1) and 16(2) can be wired in series to provide differential propulsion to the drive shafts 18(1) and 18(2).

In these arrangements, a device (not shown) attached to the steering wheel shaft, or otherwise reading the position of the steering column, could provide a signal to the control circuit to slow the inside motor during a steering maneuver. In another arrangement, the device could provide a signal to slow both motors 16(1) and 16(2) when a turn exceeds a prescribed turning radius.

Figure 5:
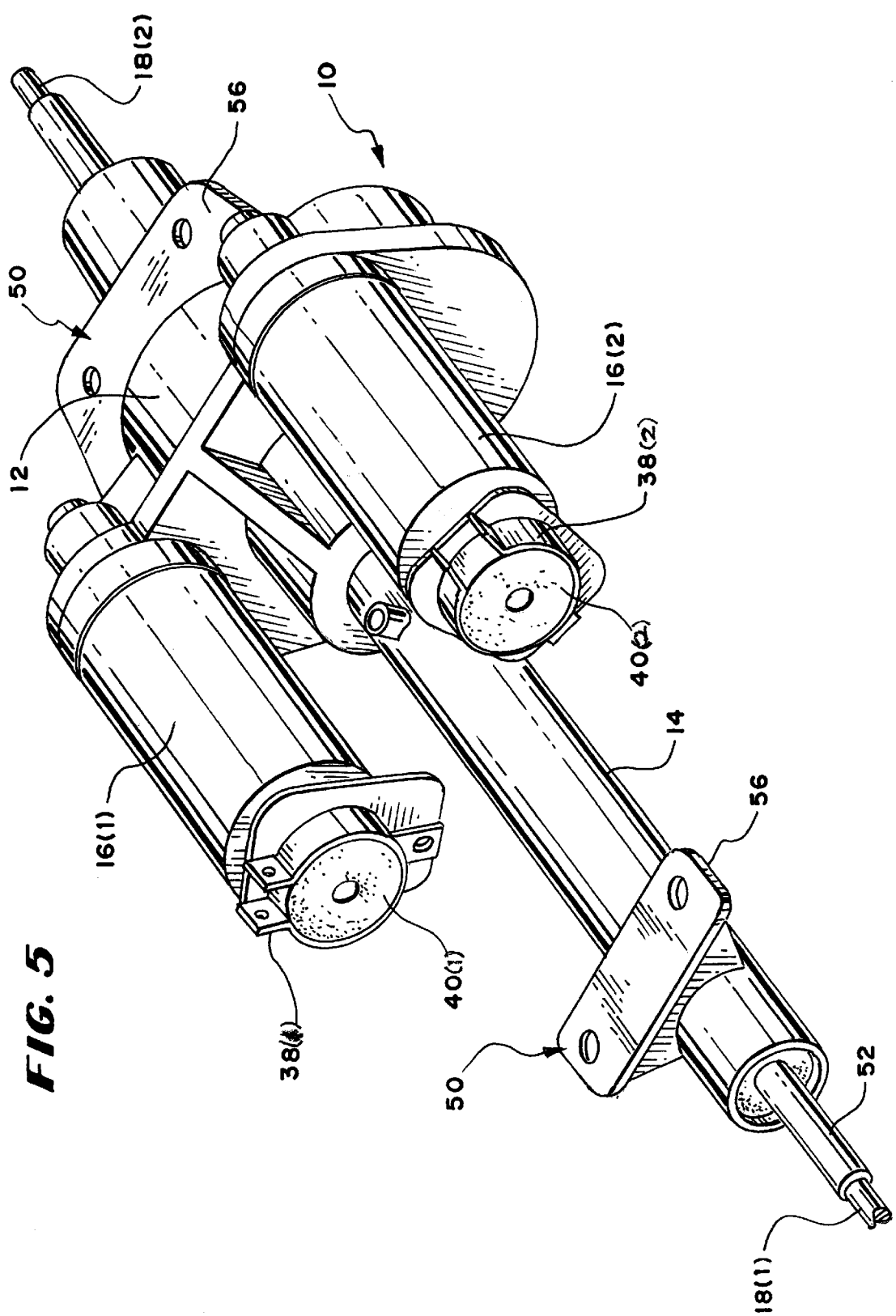
FIG. 5 is a perspective view of the dual motor gear drive assembly shown in FIG. 1, showing the inclusion of mechanical brakes.

As FIG. 5 shows, mechanical braking can be applied by use, e.g., of a band brake 38(1) and 38(2) mounted about a rear motor shaft extension 40(1) and 40(2) on each motor 16(1) and 16(2). Alternatively, as FIG. 4 shows, a mechanical band brake 38(1) and 38(2) can be mounted within the housing 12 about the output shafts 24(1) and 24(2) of the motors 16(1) and 16(2). Still alternatively, a single disc brake assembly (not shown) extending between the motors 16(1) and 16(2) can simultaneously engage the rear motor shaft extensions 40(1) and 42(2) on both motors.

The mechanical band brakes 38(1) and 38(2) or single disc brake assembly can be actuated by a foot pedal or bike-type hand lever. The gear ratio between a given motor 16(1) and 16(2) and its respective drive shaft 18(1) and 18(2) magnifies the braking torque, allowing small inexpensive mechanical brakes to be used.

Mechanical brakes on the drive shaft of each motor 16(1) and 16(2) provides direct braking to each drive wheel 20(1) and 20(2) through the individual gear sets, even if the motors 16(1) and 16(2) are wired in series to provide differential propulsion. This allows positive control of a vehicle, even on slippery slopes. In contrast, when braking is applied to a motor driving a conventional differential gear arrangement, one wheel can turn backwards through the differential gearing, allowing the vehicle to slide down hills in slippery conditions.

Alternatively, or in combination with mechanical brakes, braking can be done electronically through regenerative braking through each motor 16(1) and 16(2). Variations can include mechanical braking on one motor and use of an automatically setting electric brake on the other motor that releases when power is applied. Both electrical and mechanical brakes can be applied on the same motor, or one motor can include a mechanical brake while the other motor applies electronic regenerative braking action.

The gear drive assembly 10 provides redundancy for both propulsion and braking. If one motor 16(1) or 16(2) fails, the other can still drive the vehicle. If one brake 38(1) or 38(2) fails, the other brake can still provide braking.

Figure 6:
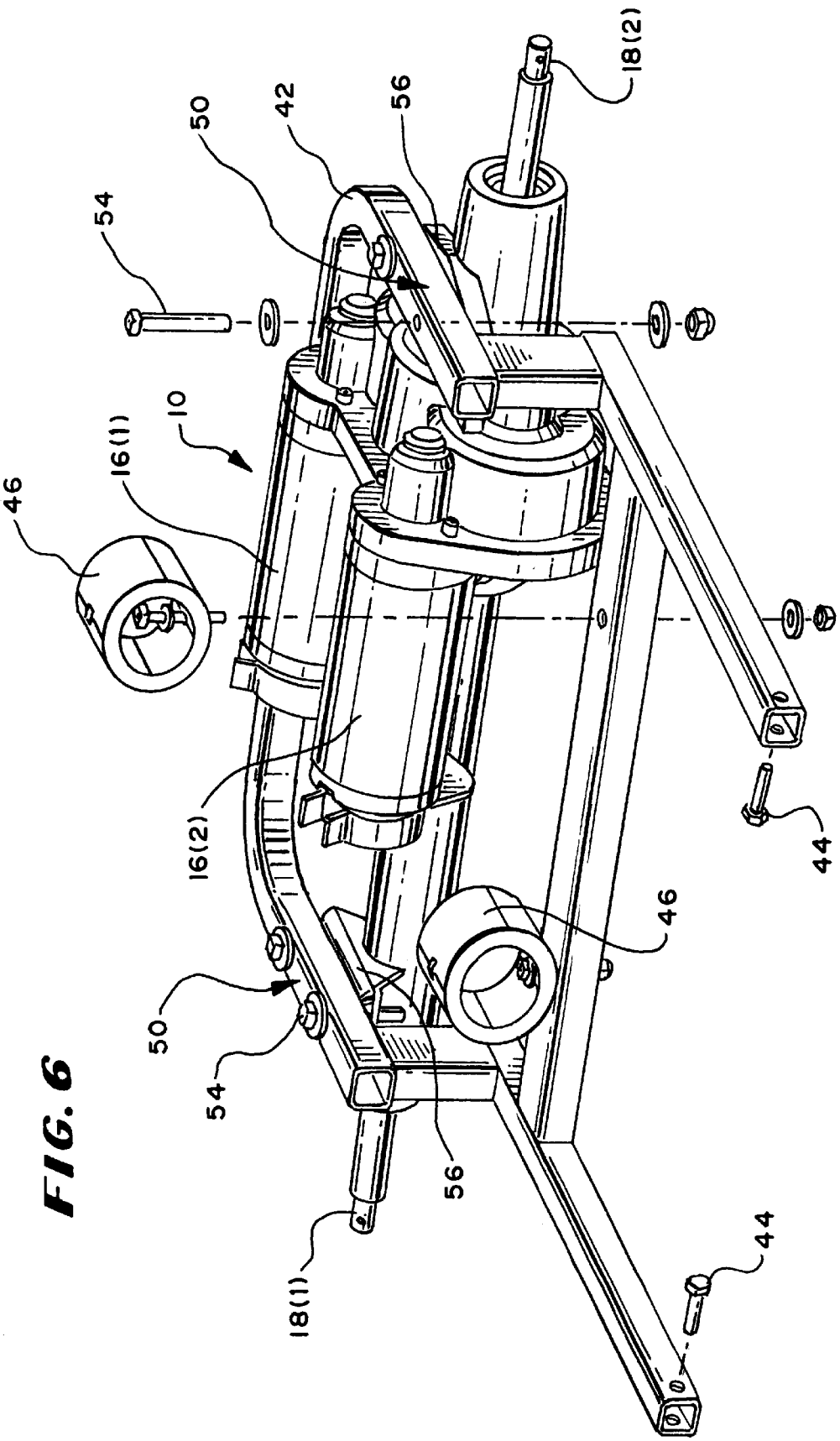
FIG. 6 is a perspective view, partially exploded, showing a representative transaxle-type mounting of the dual motor gear drive assembly shown in FIG. 1.

As FIGS. 5 and 6 shows, the gear drive assembly 10 includes a mount 50 to secure the housing 12, the first and second motors 16(1) and 16(2), and the first and second power trains to a vehicle as a one-piece, integrated axle assembly. This arrangement facilitates a transaxle type mounting arrangement (shown in FIG. 6) in a simplified, straightforward manner. Variations in widths or wheel track can be accomplished easily by use of a longer shaft and corresponding bearing tube 52 on the long shaft side of the vehicle (see FIG. 5). Complications and expense involved in mounting two individual drive gear units are avoided.

In the representative transaxle mounting arrangement shown in FIG. 6, the gear drive assembly 10 is secured by by bolts 54 to mounting brackets 56 to a U-frame suspension 42, which is pivotally mounted on pins 44 to the rear of a vehicle chassis. The presence of the transaxle mounted gear drive assembly 10 provides rigidity to the U-frame suspension 42. Springs 46, desirably made from plastic material, carried by the U-frame suspension 42 can mediate pivotal movement of the suspension 42 relative to the vehicle chassis during use.

While preferred embodiments of the invention have been described for purposes of illustration, it should be understood that further modifications will be apparent to those skilled in the art without departing from the spirit and scope of the appended claims.

We claim:

1. A gear drive unit for propelling first and second propulsion elements of a vehicle comprising:
   a housing,
   a first motor carried by the housing, the first motor having a first output shaft with a first longitudinal axis;
   a second motor carried by the housing adjacent the first motor, the second motor having a second output shaft with a second longitudinal axis which is parallel to the first longitudinal axis:
   a first power train carried by the housing coupling the first motor to the first propulsion element and not the second propulsion element;
   a second power train carried by the housing coupling the second motor to the second propulsion element and not the first propulsion element; and
   a mount to secure the housing, the first and second motors, and the first and second power trains to the vehicle as a one-piece, integrated assembly,
   wherein the first and second output shaft have ends engaged with the first and second power train and oriented in the same direction towards a common one of the first and second propulsion elements.

2. A gear drive unit according to claim 1 further including a motor control circuit electrically coupled to the first and second motors.

3. A gear drive unit according to claim 1
   further including a first motor control circuit coupled to the first motor and not the second motor and a second motor control circuit coupled to the second motor and not the first motor.

4. A gear drive unit according to claim 1 further including a brake assembly coupled directly to one of the first and second output shafts.

5. A gear drive unit according to claim 1 further including a controller operating to generate a braking signal for at least one of the first and second motors in response to a command signal.

6. A gear drive unit according to claim 5 wherein the braking signal affects regenerative braking of the at least one motor.

7. A gear drive unit according to claim 1 further including a brake assembly coupled directly to one of the first and second output shafts, and further including a controller operating to generate a braking signal for at least one of the first and second motors in response to a command signal.

8. A gear drive unit according to claim 7 wherein the braking signal affects regenerative braking of the at least one motor.

9. A gear drive unit according to claim 1 further including a braking brake that sets in response to absence of power to the motors and that releases in response to presence of power to the motors.

10. A gear drive unit according to claim 1 wherein the mount accommodates securing the housing, the first and second motors, and the first and second power trains to the vehicle as a one-piece, integrated assembly comprising an axle assembly for the vehicle.

11. A gear drive unit of claim 1 wherein the housing protectively encloses the first and second power trains and one of the first and second propulsion elements and not the first and second drive motors.

* * * * *